No. 864,081. PATENTED AUG. 20, 1907.
H. A. COOMBS.
VARIABLE SPEED DRIVING MECHANISM.
APPLICATION FILED SEPT. 17, 1904.
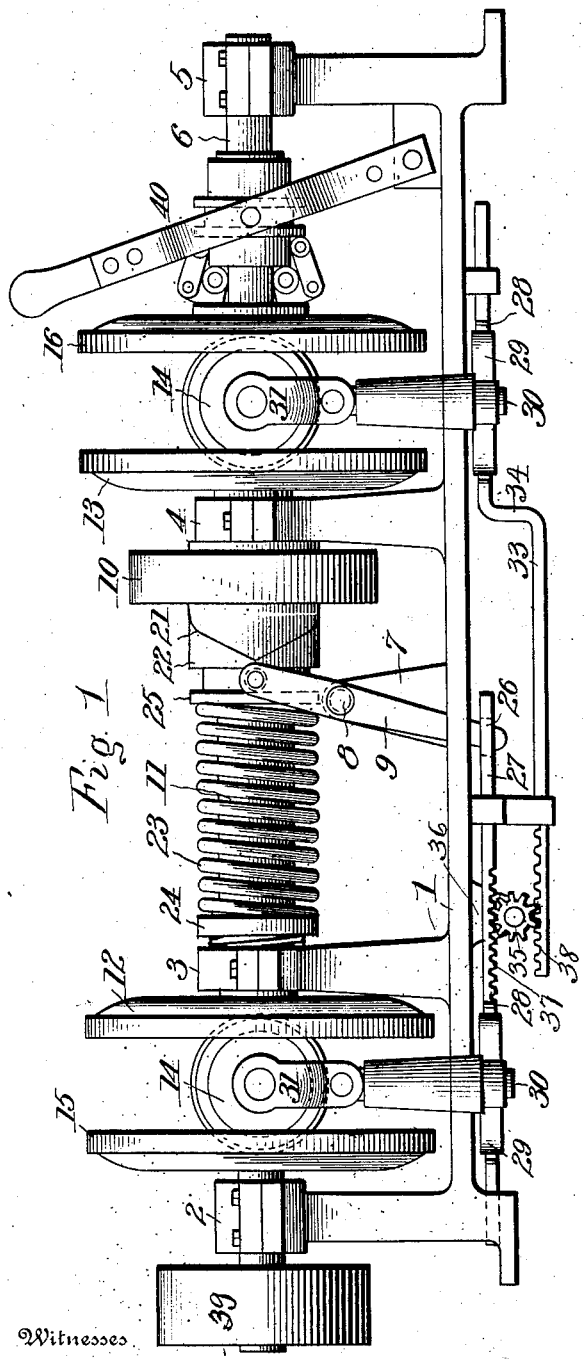
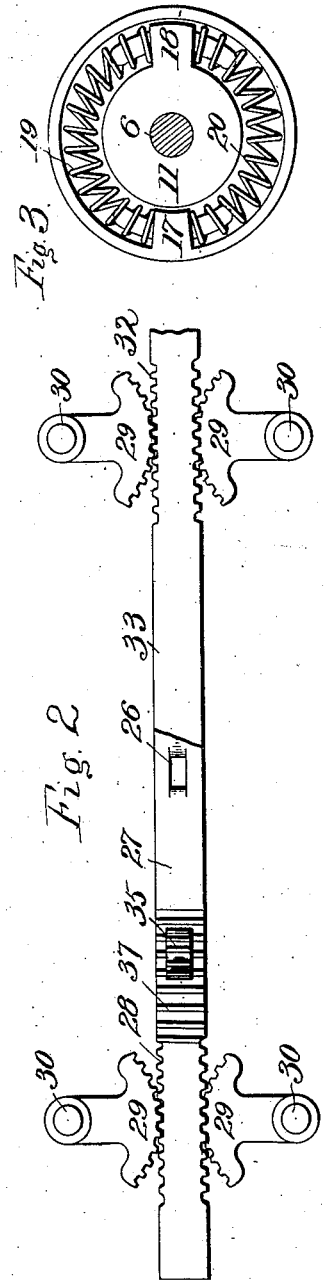
Witnesses
C. H. Walker.
John H. Hall.
Inventor
Howard A. Coombs

UNITED STATES PATENT OFFICE.

HOWARD A. COOMBS, OF WASHINGTON, DISTRICT OF COLUMBIA.

VARIABLE-SPEED DRIVING MECHANISM.

No. 864,081.  Specification of Letters Patent.  Patented Aug. 20, 1907.

Application filed September 17, 1904. Serial No. 224,824.

*To all whom it may concern:*

Be it known that I, HOWARD A. COOMBS, a citizen of the United States, residing at Washington, District of Columbia, have invented new and useful Improvements in Variable-Speed Driving Mechanism, of which the following is a specification.

My invention relates to variable speed driving mechanism and its object is to so construct and arrange the mechanism for driving machinery that the speed at which the latter will be driven will be automatically varied when variations in the load on such machinery occur. This result may be obtained in a variety of ways and by a variety of means, and in fact has long been obtained by aid of the many forms of "governors", which are too well known to need any description here. My invention however differs in principle from such governors with which I am familiar, in that the speed of the driven machine is changed directly by variations in the load and the speed-varying devices do not, as is customary, depend upon an actual variation in the speed of the machine for their operation. This and other advantages of my invention will be more fully explained hereinafter, in connection with the detailed description of the drawings.

My invention is particularly designed for use in connection with the driving of machine-tools, and for convenience, I will describe its application to a lathe, although it must be understood that its usefulness is in no way limited thereto.

Let us assume by way of illustration, that a certain lathe absorbs about five horse-power when it is doing the maximum amount of work of which it is capable without injury. This amount of power may be required by a heavy cut when the lathe is running quite slowly, or it may be required by a lighter cut when the lathe is running at a higher speed. From this it follows as a natural consequence, that the speed of the lathe should vary inversely as the resistance caused at any given instant by the cutting tool, in order that the lathe may work at its highest efficiency, *i. e.*, produce the greatest output per day. Other considerations, such as wear and tear of the lathe, smoothness and accuracy of the cut, enter into the problem in practice, and therefore subordinate speed-changing means, such as cone-pulleys or the like may be employed, but the general proposition is, as stated above, that the speed of the lathe should always increase when the cross-sectional area of the chip being removed decreases and vice versa.

It is customary to leave the control of the speed at which the lathe is run to the judgment of the workman, who only varies the same, either by shifting the driving belt from one step of the cone pulley to another, or by shifting a gear or clutch, when the speed becomes markedly too high or too low. Naturally, he cannot be continually doing this, and in consequence the lathe is run for most of the time below its maximum efficiency.

By my invention I provide means whereby the speed is automatically governed by the load, so that without any attention at all on the part of the operator, the lathe will speed up whenever the tool runs out of its cut or whenever the size of the cut decreases, and will slow down whenever the resistance increases. These variations in speed take place of course within certain limits, and the mechanism may be arranged in a manner to be described, so that the power will be cut off entirely whenever an abnormal resistance is encountered, whereby a safe guard against accident and breakage is provided. It will be noticed also as a natural consequence of the operation described, that the lathe will always run at full speed when no cut is being taken, whereby a great saving of time is effected, as on the return travel of the carriage.

In the accompanying drawing, Figure 1 is a side elevation, showing my invention applied to a speed-varying countershaft of the friction roller type; Fig. 2 is a detail bottom plan view of Fig. 1, and Fig. 3 is an end view of the driving pulley.

In Fig. 1, I have shown my invention as applied to a speed-controlling countershaft of general utility and application, the same being of the type shown in the patent to Hoffman, No. 744,550. Referring to said figures, 1 is a frame carrying the bearings 2, 3, 4, and 5, for the shaft 6, and a bracket 7 which carries the pivot 8 of lever 9. The shaft 6 is driven from pulley 10 through sleeve 11, disks 12 and 13, friction rollers 14 and disks 15 and 16, as in the said patent to Hoffman; the angular position of the rollers 14, of which there are a pair between each pair of disks, may be varied as in said patent to vary the speed of the driven member, *i. e.*, the shaft 6, which, in practice, will be connected to the machine to be driven, as by a belt on pulley 39. In the aforesaid patent this is accomplished by hand, while I have provided automatic means for this purpose. The rim of the pulley 10 is free to rotate within limits around its hub, which is a part of, or attached to sleeve 11, said rim being provided with a radial inwardly projecting lug 17, and said hub being provided with a radial outwardly projecting lug 18, between which lugs are arranged springs 19 and 20. This construction may be varied considerably without departing from my invention, the essential feature being the yielding connection between the hub and rim of the pulley or gear.

Formed integral with the rim of pulley 10 is a sleeve having cam-surfaces 21, which coöperate with like surfaces on a sleeve 22, which is keyed to slide but not rotate on sleeve 11. Sleeve 22 is kept pressed up against said cam surfaces 21 by a spring 23, the strength of which can be adjusted by a collar 24, screw-threaded into bearing 3 or adjustable relatively thereto by other well known means.

Sleeve 22 has an annular groove 25, in which engages the yoked upper end of lever 9. The lower end of this lever engages a slot 26 in a slidable bar 27, provided at one end with rack-teeth 28 on its opposite sides. These rack-teeth engage segments 29 fast on the lower ends of vertical shafts 30, carrying at their upper ends yokes 31 in which are journaled the rollers 14 between disks 12 and 15.

The rollers 14 between disks 13 and 16 are carried by similar yokes 31, swiveled to the upper ends of vertical shafts 30, carrying at their lower ends similar segments 29. These are engaged by rack-teeth 32 formed on the opposite ends of a slidable bar 33, which is bent downwardly, as shown at 34, and runs parallel to and beneath bar 27. A pinion 35, suitably journaled in brackets 36 formed on or projecting from frame 1, engages rack teeth 37 and 38 formed on the upper and lower sides of bars 33 and 27 respectively, so that when motion is imparted by lever 9 to bar 27 in one direction, bar 33 will be caused to move equally in the other direction, whereby the points of contact of the rollers 14 with the pairs of disks 12 and 13 and 15 and 16 will be moved relatively to the axis of shaft 6 correspondingly in the same direction. As shown in this figure, increase in the load will increase the speed of shaft 6, which result is desirable in some instances, but it will be obvious that by reversing pulley 10 and placing it adjacent to disk 12 instead of disk 13, the opposite result will be obtained.

40 represents in a general way the shipper mechanism, by which the disks 15 and 16 are pressed against or away from rollers 14; this feature not being in any way different from that of the aforesaid patent to Hoffman, does not need any detailed description.

In practice, manual means for reversing the lathe will be provided, either by reversing the motor or by the shifting of a clutch or a gear in the intermediate gearing; preferably also, manual means for controlling the speed, within limits, will be employed in addition to the automatic means.

Having thus described my invention and its mode of use, what I claim is:

1. In a power transmitting gearing, the combination of a shaft, a pair of driven disks on said shaft, a sleeve and an intermediate pair of driving disks thereon between and opposed to the disks of the first pair; friction-rolls between the opposed disks of both pairs, means to adjust said rolls angularly, a yieldable driving member connected to said pair of driving disks and connections from said driving member to said adjusting means.

2. A countershaft, a pair of friction disks thereon, one of said disks being fast on said shaft, a pair of rollers adjustably supported between said disks, a driving member for the other of said disks comprising a hub rigid with said disk, a rim yieldably connected to said hub, a sleeve mounted for longitudinal but not rotary movement relatively to said hub and disk, a lever engaging said sleeve at one end, and a bar connected to the other end of said lever and to said rollers to vary their angular position between said disks.

3. In a power-transmitting gearing, the combination of a driving friction disk and a driven friction disk, an angularly adjustable friction roll between said disks, a yieldable driving member operatively connected to said driving friction disk and connections between said driving member and said roll whereby the angular position of the latter varies in accordance with the load upon said driving member.

4. In a power transmitting-gearing, the combination of two driving friction disks, two driven friction disks, angularly adjustable friction rolls between each pair of disks, and a yieldable driving member mounted between said pairs of disks and operatively connected to said rolls whereby the angular positions of the latter are controlled by the amount of load on said driving member.

5. In a device of the class described the combination with a shaft, two pairs of friction disks carried thereby and intermediate friction rolls, of means to vary the angular positions of said rolls, comprising two parallel rack-bars slidably mounted, a pinion interposed between and meshing with both said rack-bars, a yieldable driving member and a lever mounted to be actuated by the yielding of said member under load and connected to one of said bars whereby an increase of load on the shaft will cause a movement of said bars in opposite directions and thereby vary the angular positions of said rolls to decrease the speed of the driven disks.

In testimony whereof I have signed my name to this specification in the presence of two subscribing witnesses.

HOWARD A. COOMBS.

Witnesses:
JOHN H. HOLT,
J. B. ROMAN.